US006073224A

United States Patent [19]
Watkins

[11] Patent Number: 6,073,224
[45] Date of Patent: Jun. 6, 2000

[54] NETWORK INTERFACE CIRCUIT WITH REPLACEMENT CIRCUITRY AND METHOD FOR SEGREGATING MEMORY IN AN ADDRESS TRANSLATION UNIT WITH LOCKED AND UNLOCKED REGIONS

[75] Inventor: John E. Watkins, Sunnyvale, Calif.

[73] Assignee: Sun Microsystems, Inc., Mountain View, Calif.

[21] Appl. No.: 08/673,050

[22] Filed: Jul. 1, 1996

[51] Int. Cl.[7] .................................................. G06F 12/10
[52] U.S. Cl. ........................ 711/202; 711/209; 711/219; 711/133; 711/207
[58] Field of Search .................................. 711/203, 209, 711/217, 218, 219, 5, 202, 133, 159, 207

[56] References Cited

U.S. PATENT DOCUMENTS

| | | | |
|---|---|---|---|
| 4,376,297 | 3/1983 | Anderson et al. | 711/207 |
| 4,727,485 | 2/1988 | Keshlear et al. | 711/207 |
| 5,592,625 | 1/1997 | Sandberg | 711/203 |
| 5,708,790 | 1/1998 | White et al. | 711/203 |

FOREIGN PATENT DOCUMENTS 2 221 066   1/1990   United Kingdom .

OTHER PUBLICATIONS

K. Holden and S. McMahan, "Integrated Memory Management for the MC68030," 1987 IEEE International Conference on Computer Design, Oct. 5, 1987, pp. 586–589.

*Primary Examiner*—Glenn Gossage
*Attorney, Agent, or Firm*—Blakely, Sokoloff, Taylor & Zafman LLP

[57] ABSTRACT

A circuit and method for segregating address entries of memory, internal to an address translation unit, into locked and unlocked regions. The locked region is a portion of the memory that can be invalidated by a lesser number of events than the unlocked region. In one embodiment, replacement circuitry of the address translation unit may invalidate address translations only stored in the unlocked region. The replacement circuitry comprises a counter to produce a first count value upon detecting that at least a first command has been issued to the address translation unit and each entry of the memory is currently in a valid state. Also, the replacement circuitry comprises an increment controller to control the counter to produce the first count value that addresses an entry of the memory within the second address range.

17 Claims, 7 Drawing Sheets

NETWORK INTERFACE CIRCUIT WITH REPLACEMENT CIRCUITRY AND METHOD FOR SEGREGATING MEMORY IN AN ADDRESS TRANSLATION UNIT WITH LOCKED AND UNLOCKED REGIONS

CROSS-REFERENCES TO RELATED APPLICATIONS

The named inventor of the present application has concurrently filed a number of United States Patent Applications that are co-pending with the subject Application. These United States Patent Applications are entitled "Asynchronous Transfer Mode (ATM) Segmentation And Reassembly Unit Virtual Address Translation Unit Architecture" (application Ser. No. 08/672,982, filed Jul. 1, 1996); "A Circuit And Method For Replacement Of Address Translations" (application Ser. No. 08/673,004, filed Jul. 1, 1996), "A Circuit And Method For Flush Checking Memory Of An Address Translation Unit" (application Ser. No. 08/674,095, filed Jul. 1, 1996) and "Data Buffer Prefetch Apparatus and Method" (application Ser. No. 08/675,263, filed Jul. 1, 1996).

BACKGROUND OF THE INVENTION

1. Field of the Invention

The present invention relates to the field of data transfer. More particularly, the present invention relates to a circuit and method for enhancing performance of an address translation unit ("ATU") by using system software and minimal circuitry to segregate its addressable memory into locked and unlocked regions.

2. Description of Art Related to the Invention

For over a decade, a number of system architectures have been developed with input/output ("I/O") devices accessing main memory through direct virtual memory accesses DVMA using virtual addresses, instead of direct memory accesses ("DMAs") using physical addresses. One advantage associated with DVMA systems has been the simplification of data accesses by the I/O devices. For example, I/O devices accessing memory through DMAs ("DMA I/O devices") must be controlled to "scatter" (or allocate) data to a number of potentially discontiguous physical pages as well as to "gather" data. Gathering data that exceeds one page in length is normally accomplished by accessing a group of potentially discontiguous physical pages. In contrast, I/O devices that access main memory through DVMAs ("DVMA I/O devices") do not require such control because data accesses are made through contiguous virtual pages.

Although the DVMA systems have simplified this "scatter-gather" problem, these systems require the virtual addresses issued by the DVMA I/O devices to be translated into physical addresses before data can be accessed from main memory. As shown in FIG. 1, a conventional DVMA system 100 utilizes an I/O Memory Management Unit "I/O MMU" 110, sometimes referred to as an I/O Translation Lookahead Buffer, to translate virtual addresses to physical addresses utilized by main memory 120. As shown, the I/O MMU 110 is implemented within a bridge element 130 that couples an I/O bus 140 and a system bus 150.

Typically, the I/O MMU 110 is often configured to contain a limited number "r" thereof address translations of internal memory to increase system performance with minimal additional costs. Each of these address translations is assigned to a designated entry of internal memory. For example, the internal memory may include 16 fully-associative entries. The entries may be uniquely designed through tag bit(s) as an "unlocked" entry or a "locked" entry. A locked entry contains contents considered to be "generally static" because these contents are modified less often than unlocked entries. Thus, the contents of the unlocked entry is considered to be "generally dynamic" because the contents are modified with greater frequency than other entries in I/O MMU. A search engine is implemented in the I/O MMU 110 to check the tag bits during entry replacement.

However, the conventional entry locking mechanism imposes a number of disadvantages on current systems. One disadvantage associated with the conventional lock entry mechanism relates to increased costs associated with increased memory requirements to accommodate tag bits, develop search engine circuitry and use of limited I/O MMU space. Moreover, there are performance costs due to the presence of long lookup times.

With the emergence of multi-media communications, networks are now being required to support multiple data types. As a result, network manufacturers are tending to concentrate their efforts toward asynchronous transfer mode ("ATM") networks. In ATM networks, a large number of virtual channels, perhaps hundreds, can be in operation simultaneously. Hence, if the DVMA system 100 is configured to support an ATM network coupled to I/O network interface logic 170, it would experience significant performance degradation caused by excessive fetching of address translations from main memory.

To substantially avoid performance degradation, an address translation unit ("ATU") may be implemented within a Network Interface Circuit ("NIC") coupled to the I/O bus. The NIC would be used to interconnect the ATM network environment to the DVMA system. Thus, the I/O MMU may be bypassed by the ATU, placing a physical address on the I/O bus instead of a virtual address. To accomplish this task, the ATU would contain a set of modifiable virtual-to-physical address translations, and thereby would experience the same disadvantages experienced by the I/O MMU upon adopting the conventional lock entry mechanism utilizing tag bits.

Hence, it would be advantageous to develop an entry locking mechanism that avoids the use of tag bits, but rather relies on system software to allocate which portions of internal memory within the ATU are generally static and which portions are dynamic.

SUMMARY OF THE INVENTION

The present invention relates to a circuit and method for segregating address entries of memory, internal to an address translation unit, into locked and unlocked regions. The locked region is a portion of the memory that is invalidated (e.g., set to an invalid state) by a lesser number of events (e.g., only under system software control) than the unlocked region. Thus, replacement circuitry of the address translation unit may invalidate address translations only stored in the unlocked regions. This allows address translations considered to be more static in nature, such as an address translation of a descriptor ring, from being replaced for address translations considered to be less static in nature. As a result, performance of the system utilizing the address translation unit is enhanced.

The circuit includes a counter coupled to the address translation unit and an increment controller coupled to the counter. The counter is configured to produce a count value upon detecting that a TRANSLATE command has been issued to the address translation unit and each entry of the memory is currently placed in a valid state. The increment controller is configured to control the counter to produce the count value associated with entries of the second address range.

BRIEF DESCRIPTION OF THE DRAWINGS

The features and advantages of the present invention will become apparent from the following detailed description of the present invention in which.

DESCRIPTION OF THE PREFERRED EMBODIMENT

In the following detailed description, the present invention describes circuitry and a method for enhancing performance of an address translation unit ("ATU") by using system software and minimal circuitry to segregate addressable entries of a memory element to "locked" and "unlocked" regions. Such segregation is performed without the use of tag bits as previously used in prior systems and limits the amount of memory which can be updated by replacement circuitry of FIG. 6.

A number of terms are frequently used herein to describe certain control circuits and binary representations which are defined herein. A "word" is preferably 4 bytes (32-bits) in length, but may be any "$2^x$" byte in length (where $x \geq 0$). A "packet" is a plurality of words stored, transmitted or received in succession. An "address translation" is a mapping between a virtual address and a physical address. A "flush" operation is a removal of an address translation from one or more storage locations. The term "asserted" is defined as the activation or setting of a preselected logic value. Moreover, a "virtual address" may be construed as the entire virtual address or a portion thereof (e.g., a virtual page number). Likewise, a "physical address" may be construed as the entire physical address or a portion thereof (e.g., a physical page number).

Figure 1:
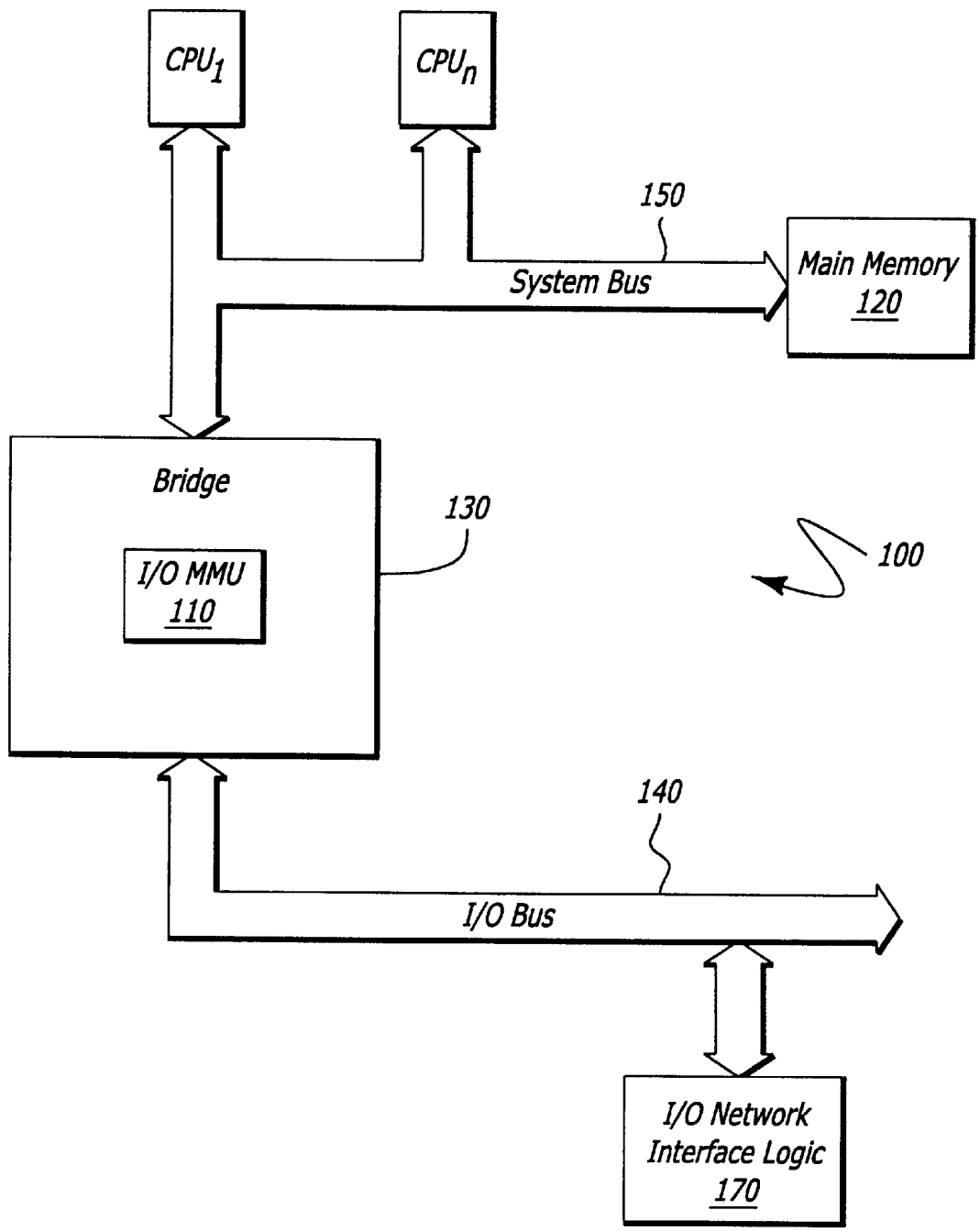
FIG. 1 is a block diagram of a conventional DVMA system including an I/O Memory Management Unit employed within the bridge element.
Figure 2A:
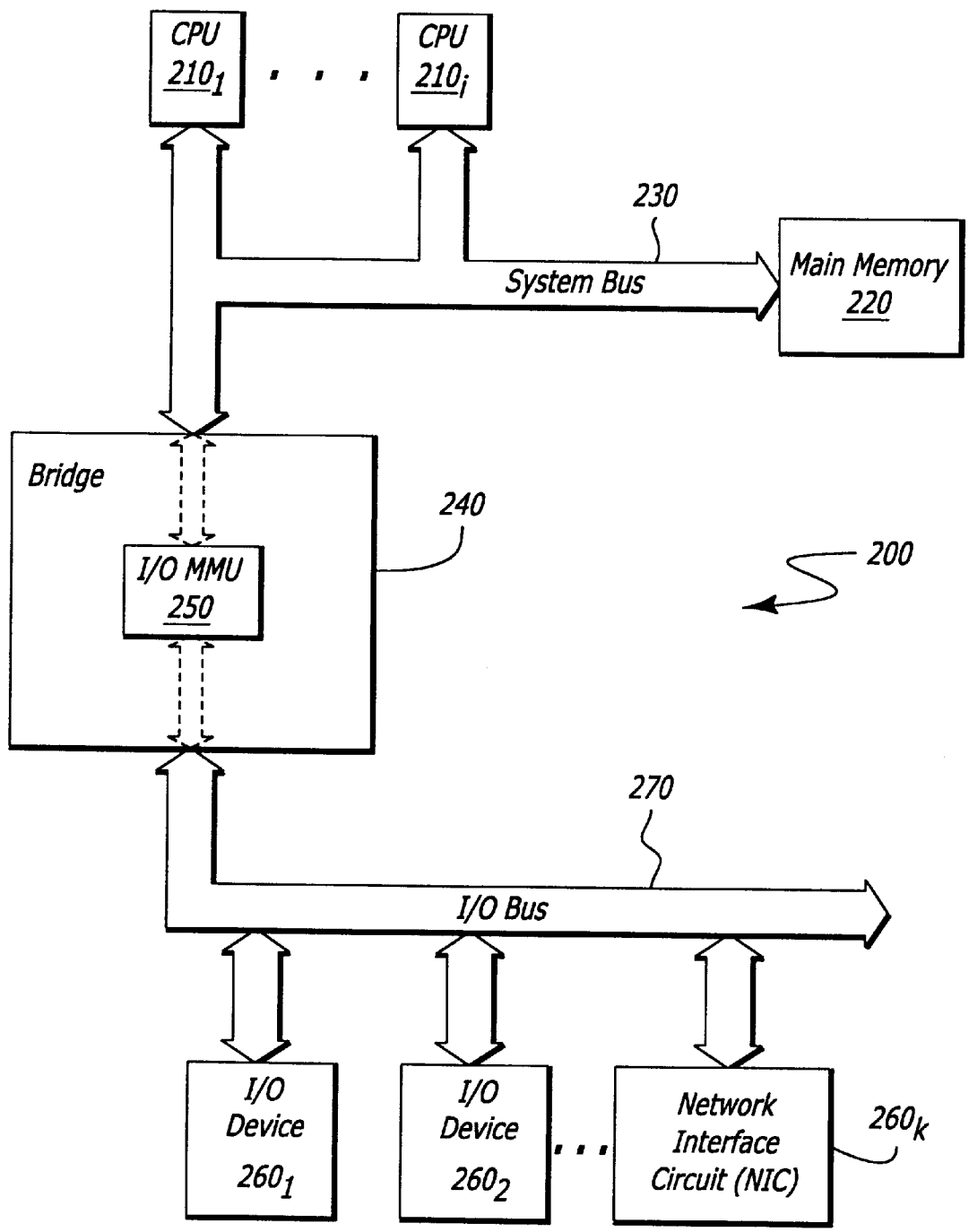
FIG. 2A is a block diagram of an embodiment of an electronic system including an I/O Memory Management Unit employed within the bridge element and an address translation unit ("ATU") employed within a Network Interface Circuit ("NIC").

Referring to FIG. 2A, an embodiment of an electronic system 200 such as, for example, a workstation manufactured by Sun Microsystems of Mountain View, Calif., is illustrated. The electronic system 200 operates as a DVMA system, although it is contemplated that the present invention may function in conjunction with a DMA type system.

As shown, the electronic system 200 comprises one or more microprocessors $210_1$–$210_j$ ("j" being a whole number, $j \geq 1$) coupled to main memory 220 through a system bus 230 to enable communications therebetween. The system bus 230 is further coupled to a bridge element 240, including an I/O MMU 250, to enable communications between components coupled to the system bus 230 (e.g., main memory 220, microprocessor(s) $210_1$–$210_j$, etc.) and a plurality of I/O devices $260_1$–$260_k$ ("k" being a whole number, $k \geq 2$) coupled to an I/O bus 270. The I/O bus 270 may include, but is not limited to, a Peripheral Component Interconnect ("PCI") bus developed by Intel Corporation of Santa Clara, Calif. For example, the PCI bus may support 64-bit address/data propagation at approximately 66 megahertz ("MHz") or 32-bit address/data propagation at approximately 33 MHz.

Although not shown, the main memory 220 includes a plurality of free memory buffers, a Receive ("RX") descriptor ring and a RX Completion ring to support RX operations (not shown). Likewise, there are similar elements to support Transmit ("TX") operations. Normally, the buffers are storage locations consecutively addressed in virtual memory, but are not necessarily contiguous in physical memory. The buffers may be of various sizes, occupying one or more virtual pages. Each descriptor ring includes a plurality of descriptors, one of these descriptors being shown in FIG. 2B.

Figure 2B:
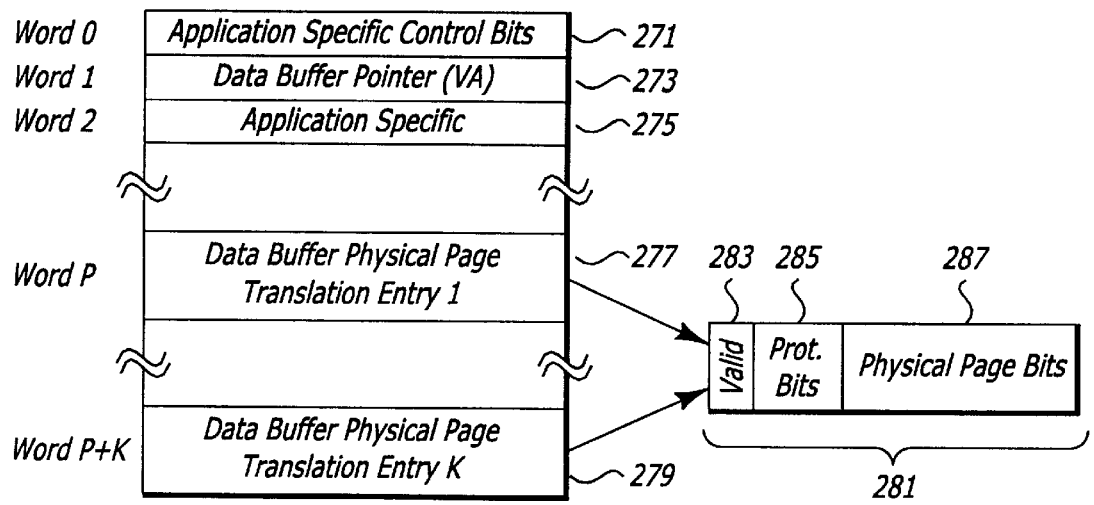
FIG. 2B is a block diagram of an embodiment of a data structure of a descriptor from a descriptor ring stored in main memory of the electronic system of FIG. 2A.

Referring now to FIG. 2B, a sample descriptor format 289, which is a basic data structure that can be used by a Segment and Reassembly ("SAR") unit to transport packet data between main memory 220 and the network, is shown. In one embodiment, descriptors are arranged (64 bytes apart between each descriptor) in a ring structure (which is not shown). These descriptors point to a set of data packets to be sent to the network (in the transmit case) or the descriptors point to a set of free memory buffers to hold incoming packets (in a receive case). In one embodiment, each descriptor is of a fixed length and comprises a plurality of words, ranging between three and sixteen contiguous 32-bit words. The descriptors are placed consecutively in virtual memory in a ring structure. Each of these descriptors, which are located in main memory, point to a data buffer (in the transmit ("TX") case) which is also located in main memory.

As shown in block 271 of the descriptor 289, word 0 contains application specific control bits. Block 273 illustrates that word 1 contains a virtual address ("VA") pointer which points to the beginning of a data buffer. Block 275 shows that word 2 of the descriptor 289 contains application specific information. The end of the block 277 and 279 contains information on the physical page location of the physical address ("PA") that maps to the virtual address contained in block 273 and associated with this descriptor 289. Block 277 illustrates that word "P" contains a translation entry 1 for the first physical page. Each physical page of the physical address contains its own entry. In one embodiment, the last word "P+K", where "P" is a predetermined number greater than 2, and "K" is equal to the number of pages the data buffer spans −1 as illustrated by block 279. If a data buffer spans ten pages, then there will be ten translation entries at the end of descriptor 289. Thus, caching the physical address of objects greater than one page size is supported by embedding multiple translations within a descriptor.

A sample physical translation format 281 is also shown in FIG. 2B. In one embodiment, this format 281 includes a valid bit 283, protection bits 285 and the actual physical page bits 287. The valid bit 283, in the descriptor, determines if a specific translation entry will be placed into the ATU (if valid bit 283 is set) or ignored (if valid bit 283 is cleared). The protection bits 285 are transferred through control line 560 of FIG. 5 in determining whether a page is accessible using the ATU's physical translation for the virtual address. For instance, a read-only page can be protected from writes with a read only page protection bit. The physical page bits 287 provide the virtual to physical address mapping for the corresponding portion of the data buffer in virtual address space. The data buffer pointed to by the data buffer pointer 273 can span one or more virtual pages and are not necessarily contiguously placed in physical memory.

Figure 3:
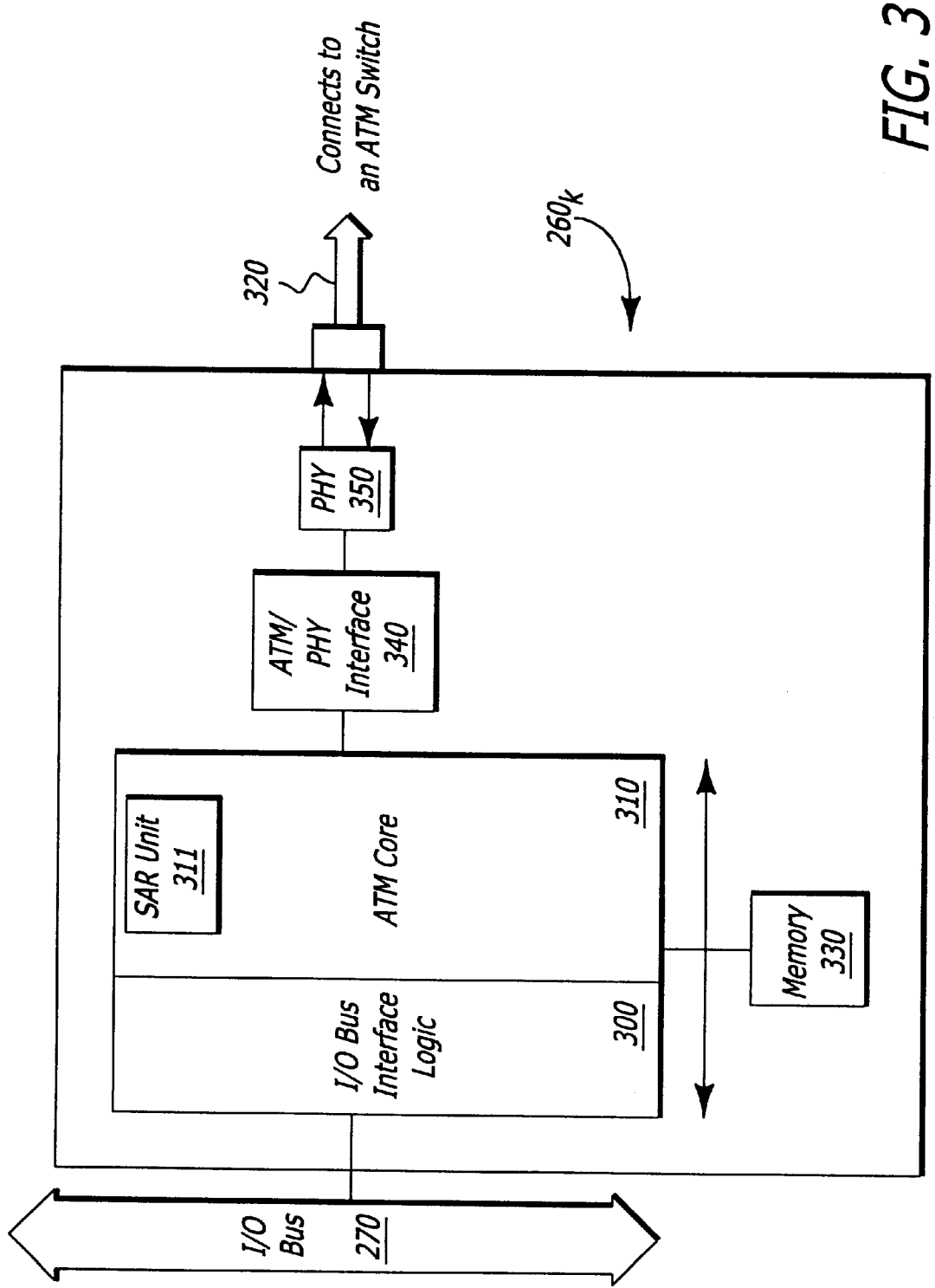
FIG. 3 is a block diagram of a general embodiment of a NIC interconnecting communication medium of a network and an I/O bus of a workstation coupled to the network.

Referring to FIG. 3, one of the plurality of I/O devices, for example I/O device 260$_k$, comprises a Network Interface Circuit ("NIC"). The NIC 260$_k$ includes I/O bus interface logic 300 and an ATM core 310, both of which collectively operate to transfer data between the electronic system and other remotely located electronic systems through multiple virtual channels normally utilizing full duplex media 320. The media 320 may include optical fiber, twisted pair or any other high speed communication medium normally supporting a transfer rate of 155 million bits per second ("Mbps"), 622 Mbps, or even at speeds faster than 622 Mbps.

The ATM core 310 features a segmentation and reassembly ("SAR") unit 311 which facilitates segmentation and reassembly of data cells (e.g., a standard ATM cell absent a checksum byte) and utilizes off-chip memory 330 for storage. The ATM core 310 exchanges data cells with an ATM/physical (PHY), interface 340 conforming to the well-known Universal Test and Operations Physical Interface for ATM ("UTOPIA") standard. The ATM/physical interface 340 is positioned to insert a checksum in a header of an out-going data cell to produce an ATM cell or to calculate whether the checksum of an in-coming ATM cell is correct, and if so, removing the checksum before transferring the data cell into the ATM core 310. A physical layer 350 is implemented for proper electrical voltage line termination. A description of the ATM core may be found in a co-pending U.S. patent application entitled "Method and Apparatus for Coordinating Data Transfer Between Hardware and Software" (application Ser. No. 08/499,317; filed Jul. 7, 1996) by Rasoul Oskouy and Denton E. Gentry, now U.S. Pat. No. 5,675,829. That U.S. patent application is owned by Assignee of the present application.

For ATM cell transmission, the ATM core 310 is initially provided a starting location of the TX descriptor ring. The ATM core 310 fetches the first TX descriptor to obtain the virtual address of the data buffer associated with the first TX descriptor. Next, the data buffer is accessed to propagate data into the SAR unit 311 for segmentation into one or more ATM cells transmitted through the physical media 320. After transmission of the ATM cell(s) (or at least storage of the data in local buffers of SAR unit 311), the SAR unit 311 may acknowledge completion by writing status information to the TX completion descriptor ring and generating an interrupt to the system to alert the processor accordingly.

During reception, incoming ATM cells are reassembled into packets of data which are subsequently stored in free memory buffers indicated by a virtual address pointer contained in its corresponding RX descriptor.

Figure 4:
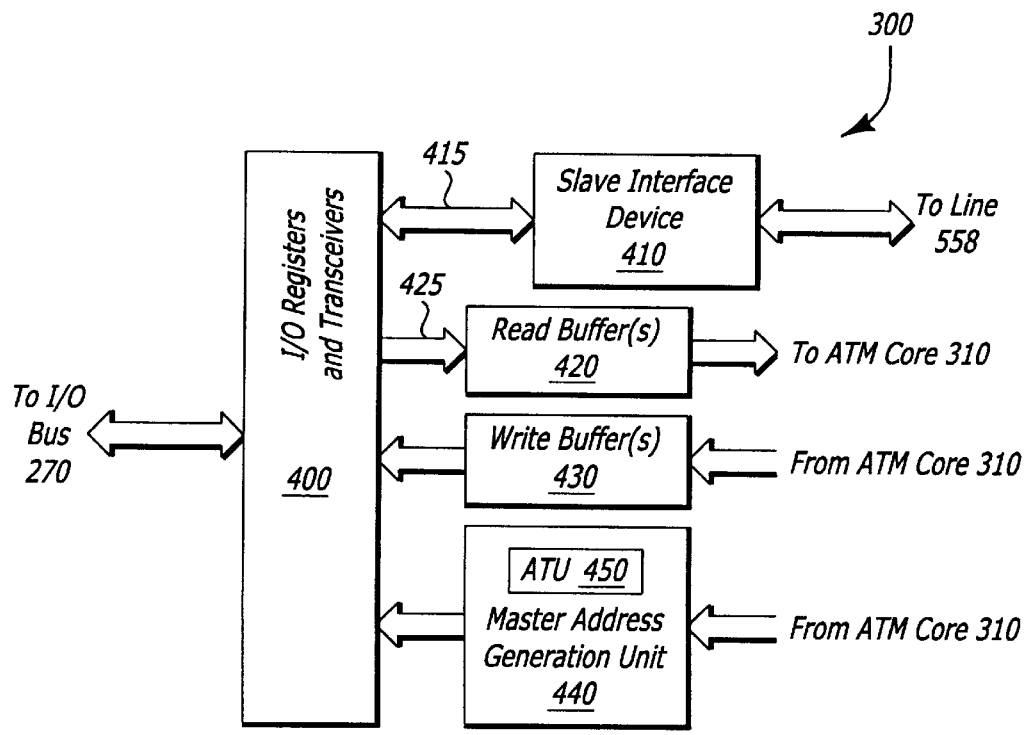
FIG. 4 is a block diagram of one embodiment of the I/O bus interface logic including an address translation unit.
Figure 5:
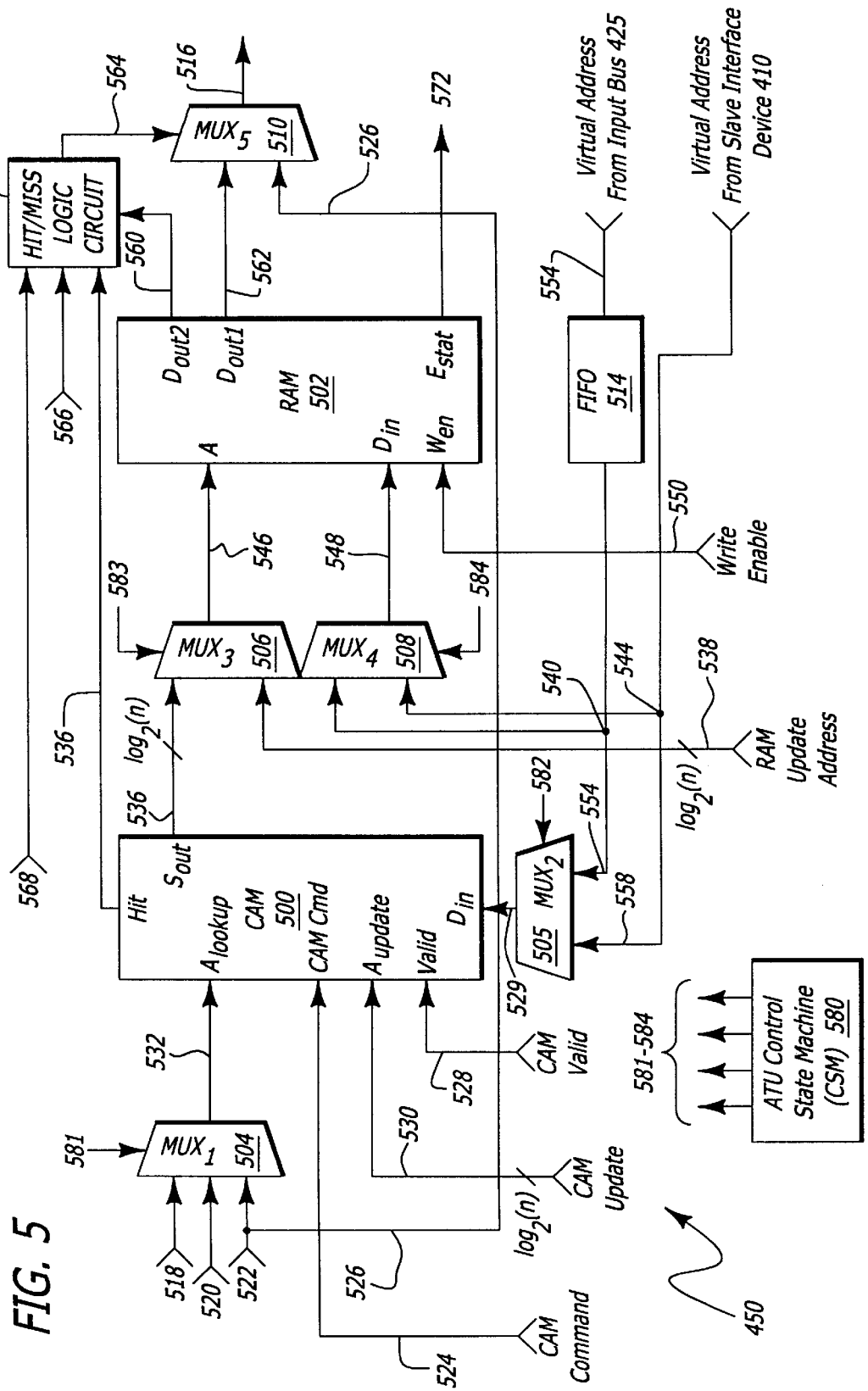
FIG. 5 is a block diagram of a preferred embodiment of the address translation unit ("ATU") of FIG. 4.

Referring now to FIG. 4, an embodiment of the I/O bus interface logic 300 coupled to the I/O bus 270 (e.g., PCI bus with a 64-bit address/data lines operating at approximately 66 MHz for this embodiment) is shown. The I/O bus interface logic 300 includes I/O registers and transceivers 400 (e.g., PCI I/O registers and transceivers) coupled to a slave interface device 410 via an I/O bus line 415. The slave interface device 410 may include an ATU control register (not shown) used to control various features of the ATU. Moreover, the I/O bus interface logic 300 includes one or more read buffers 420 via an input bus 425, as well as one or more write buffers 430, and a master address generation unit 440. Although not shown, the input bus 425 is further coupled to the master address generation unit 440, namely a FIFO storage element as shown in FIG. 5, to receive descriptor related information. The read buffer(s) 420 is (are) used to temporarily store information from the I/O bus 270 while the write buffer(s) 430 is (are) used to temporarily store information via a write data path from the SAR unit.

Implemented within the master address generation unit 440 is an address translation unit ("ATU") 450 that receives information from the SAR unit 311 of the ATM Core. This information includes the virtual address to be translated, the size of the address and the type of access (e.g., access to descriptor ring or buffer). The presence of the ATU 450 allows the electronic system to (i) translate the virtual address into a physical address and subsequently bypass the I/O MMU 250 of FIG. 2A, or (ii) transmit the virtual address to the I/O MMU 250 of FIG. 2A.

Referring now to FIG. 5, an embodiment of the ATU 450 is shown. The ATU 450 may be configured to be fully associative. However, it is contemplated that another memory access scheme, such as direct mapped or N-way associative, may be utilized in order to meet a desired translation hit rate.

The ATU 450 includes a content addressable memory ("CAM") element 500 and random access memory ("RAM") element 502, which collectively contain "n" address translations ("n" being a whole number, n≧1). More specifically, the CAM element 500 includes logic that supports loading of a virtual address and control information in one of "n" entries as well as performing address lookup searches of the entries. The control information may include a CAM Valid bit indicating, when set, that the entry contains a virtual address currently being used for address translations. The CAM element 500 further includes (i) a plurality of input ports and (ii) a plurality of output ports.

The plurality of input ports are used to load address and control information into the entries of the CAM element 500. As shown, there are five (5) input ports used to load information into the CAM element. The first input port is a data input ("D$_{in}$") port used for loading a selected virtual address provided by a select element (e.g., multiplexer (MUX) 505) via address lines 529. The second input port is an address update ("A$_{update}$") port for receiving, via CAM Update address lines 530 an entry number of the entry selected to be loaded with the virtual address on the data lines 529. The third input port is a command ("CAM command") port from which the CAM element 500 receives command information to control its operation via command lines 524. Types of commands include, but are not limited to "Translate" or "Update". In addition, the fourth input port is an entry valid ("Valid") port through which a control line 528, representative of the CAM Valid bit of an entry addressed by the A$_{update}$ port, is asserted or de-asserted depending on if the entry is "valid" (e.g., in a "valid" state or currently being used), or "invalid" (e.g., in an "invalid" state or stale). The fifth input port is an address lookup ("A$_{lookup}$") port from which the CAM element 500 receives a virtual address (e.g., page number) via lookup address lines 532 to be compared with the virtual addresses stored in each of its entries. If a match occurs, an output ("Hit") port and its control line (referred to as "CAM_Hit" 536) is asserted (i.e., an active signal is produced). As a result, a signal out ("$S_{out}$") port propagates the entry number of the CAM entry containing the virtual address through signal lines 534.

Referring still to FIG. 5, the RAM element 502 is configured to contain the corresponding physical address for the virtual address stored in CAM element 500. Similar to the CAM element 500, the RAM element 502 includes a plurality of input and output ports. More particularly, the RAM element 502 includes a data input ("$D_{in}$") port used for loading, via data lines 548, a physical address corresponding to the virtual address loaded into the CAM element 500. The RAM element 502 further includes an address ("A") port for entry lookups and entry updates. A write enable ("$W_{en}$") port is used to distinguish between an entry update (e.g., $W_{en}$ line 550 being asserted) and entry lookup (e.g., $W_{en}$ line 550 being de-asserted). In addition, the RAM element 502 includes a first data out ("$D_{out1}$") port to output the physical address corresponding to the virtual address being translated or searched, via address lines 562 and a second data out ("$D_{out2}$") port to output write protection information contained in the selected entry via control line 560. Moreover, the RAM element 502 includes an entry status ("$E_{stat}$") port to provide information indicating which entries of the CAM and RAM elements have been accessed via Entry status lines 572.

In addition to the CAM and RAM elements 500 and 502, the ATU 450 further includes a first group of control logic that controls the loading and flushing of the address translations, and a second group of control logic that controls whether the ATU 450 should output a virtual or physical address via address lines 516. An indicator used to bypass I/O MMU may include, but is not limited to, a high order address bit being set or cleared, a specific subset of the address space being accessed, etc. For example, in one embodiment, the bridge element 240 such as that shown in FIG. 2A provides an address range within the 64-bit address space which when accessed treats the lower 41 bits of the address as a physical address.

As shown, the first group of control logic includes a plurality of select elements 504–506 and 508 (e.g., multiple input multiplexers), and a first-in, first-out ("FIFO") storage element 514. The FIFO storage element 514 is used to temporarily store virtual/physical address translations as they are read from the input bus 425 during descriptor fetches.

The plurality of select elements 504–506 and 508 are controlled by ATU control state machine ("ATUCSM") 580 through control lines 581–584. A first select element 504 is coupled to the $A_{lookup}$ port of the CAM element 500 via lookup address lines 532 in order to route the virtual address to be searched within the CAM element 500. This select element receives as input virtual addresses (or virtual page numbers) through software flush address lines ("SW Flush address lines") 518, hardware flush address lines, ("HW Flush address lines") 520 and address lines 522 for usual translation loading. The second select element 505 is coupled to the $D_{in}$ port of the CAM element 500 via data lines 529 to load either a (i) virtual address obtained from a descriptor fetch via lines 554, or alternatively, (ii) a virtual address of a data buffer specified manually by software writing the buffer's virtual address into CAM element 500. This is an access of the slave interface device (of FIG. 4) 410 resulting in that virtual address being placed on lines 558. A third select element 506 is coupled to the address port via address lines 546 to transmit therein either a RAM Update address via a RAM Update address line 538 or an entry number output from the CAM element 502 through the $S_{out}$ port via signal lines 534. The fourth select element 508 is coupled to the $D_{in}$ port via address lines 548 to input physical addresses and control information from lines 540 and 544.

The second group of control logic includes a hit/miss logic circuit 512 and a fifth select element 510. The hit/miss logic circuit 512 is combinatorial logic configured to control whether the fifth select element 510 outputs onto the address lines 516 (i) a translated physical address received from lines 562 or (ii) the virtual address for lines 526 to be subsequently translated by the I/O MMU. Such control is performed by the assertion or de-assertion of an ATU_Hit control line 564.

The translated physical address is output from the fifth select element 510 under all conditions unless (i) the CAM_Hit line 536 is not asserted thereby indicating a "lookup miss", (ii) the ATU 450 is disabled by system software not asserting an ATU enable line 566, (iii) a cycle status line 568 is not asserted indicating that this particular translation should be avoided, or (iv) the protection bits 560 signify that the cycle in progress is prohibited due to reasons including, but not limited to, an attempted write access of a read-only page.

As shown, the ATU 450 is configured with memory, included in the CAM and RAM elements 500 and 502, supporting a limited number of address translations. Hence, it would be advantageous to develop a lock entry mechanism to contain (i) generally static address translations (e.g., translation for a ring descriptor) in "locked" region of memory and (ii) generally dynamic address translations (e.g., translation for a buffer) in an "unlocked" region of memory. Such lock entry mechanism would improve performance of the electronic system by reducing the number of fetches to main memory for I/O MMU translation "misses".

Figure 6:
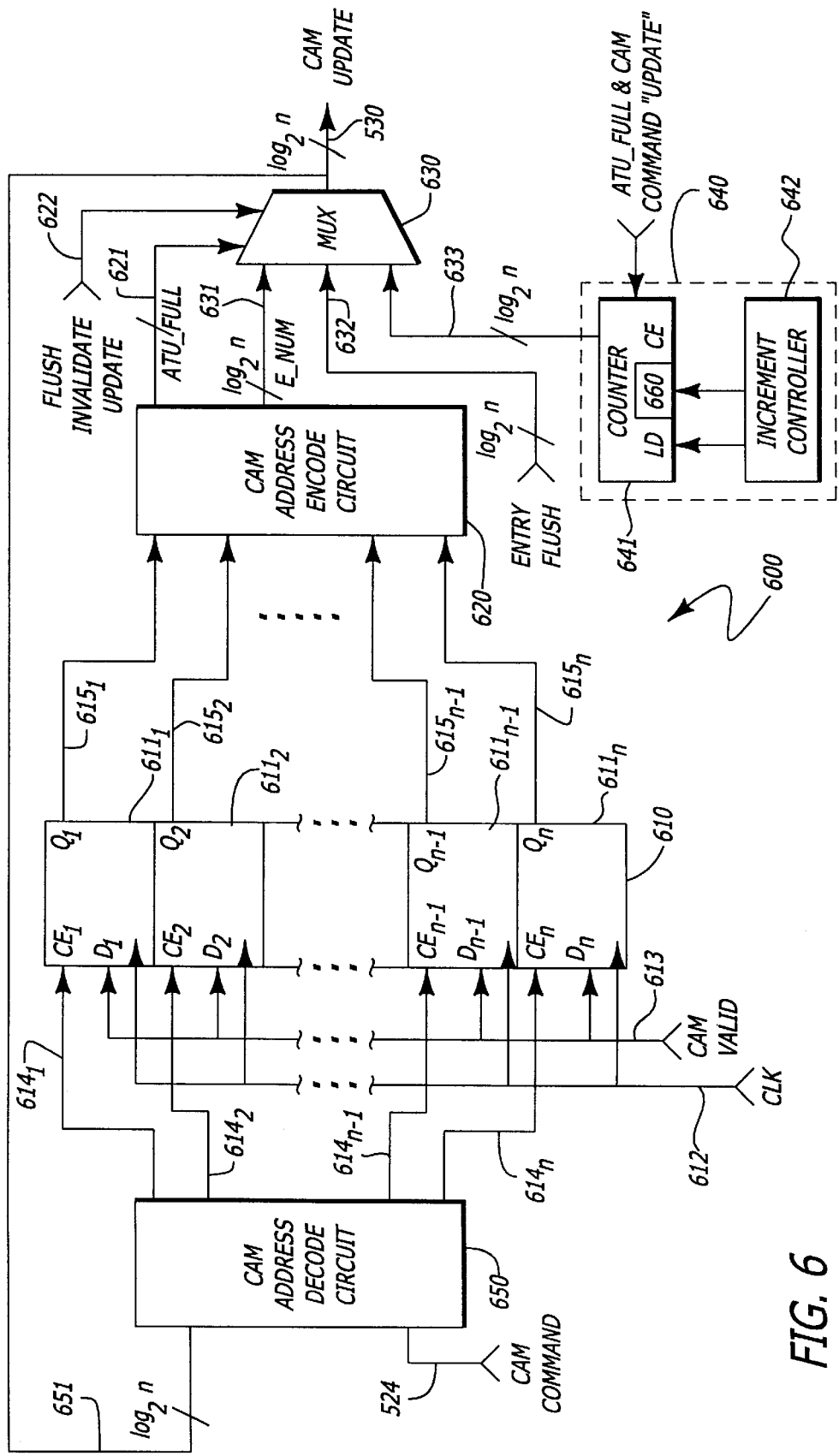
FIG. 6 is a block diagram of an embodiment of replacement circuitry of the ATU control state machine that control segregation of entries of the address translation unit of FIG. 5.

The lock entry mechanism is implemented within a portion of the ATU control state machine 580 of FIG. 5, namely replacement circuitry as shown in FIG. 6. This replacement circuitry 600 includes at least an ATU replacement element 610, a CAM Address Encode circuit 620, a select element 630, an increment circuit 640 and a CAM Address Decode circuit 650. In particular, replacement circuitry 600 is coupled to the CAM Update address control lines 530 to select which entry of the CAM element is to be loaded with a virtual address from either the I/O bus line 415 or the input bus 425 of FIGS. 4 and 5. It is contemplated, however, that the RAM Update address lines 538 may be coupled to the CAM Update address lines 530 in order to receive the same entry number selections to maintain operation coherency.

The ATU replacement element 610 is a plurality of storage elements (e.g., "n" storage elements $611_1$–$611_n$), each storage element uniquely corresponding to one CAM entry. As shown in FIG. 6, each of the plurality of storage elements $611_1$–$611_n$ is implemented as a 1-bit register being clocked at a predetermined frequency "CLK" through clock line 612. It is contemplated, however, that the storage elements $611_1$–$611_n$ may include other types of storage devices besides 1-bit registers.

When one of a plurality of clock enable control lines $614_1$, ..., or $614_n$ (e.g., clock enable control line $614_1$) is asserted by the CAM Address Decode circuit 650, a storage element associated with the clock enable control line (e.g., storage element $611_1$) is "set" by loading a CAM Valid bit value therein. The CAM Valid bit value (e.g., a logic "1") is loaded via a data input line 613 in order to represent that the CAM and RAM entries, corresponding to the storage element, contain a valid address translation. Thus, the plurality of storage elements $611_1$–$611_n$ provide an external copy of the state of each CAM entry.

The CAM Address Encode circuit 620 is combinatorial logic coupled to the ATU replacement element 610 in order to monitor the contents of each of the plurality of storage elements $611_1$–$611_n$. Typically, this monitoring is performed by reading the contents of the storage elements $611_1$–$611_n$ provided through data lines $615_1$–$615_n$ and then ascertaining if at least one storage element $611_1$, . . . , or $611_n$ is not set (e.g., determining if at least one CAM entry is not currently being used for translations). The CAM Address Encode circuit 620 further includes an ATU__Full select line 621 and a number (e.g., $\log_2(n)$) of data input lines 631 (referred to as "E__Num" lines 631) of the select element 630.

Upon detecting at least one storage element that is not set (referred to as an "empty storage element"), the CAM Address Encode circuit 620 performs three operations. Namely, the CAM Address Encode circuit 620 (i) selects the empty storage element, (i) outputs an entry number, which represents the location of the empty storage element in the ATU replacement element 610, to the select element 630 via the E__Num lines 631, and (iii) de-asserts the ATU__Full select line 621. Thereafter, the entry number is transferred through the select element 630 to the CAM Update address lines 530, thereby loading the virtual address of the address translation in an entry of the CAM element corresponding to the entry number. Moreover, the physical address of the address translation is preferably loaded in an entry of the RAM element corresponding to the entry number. However, if there does not exist any empty storage elements, the CAM Address Encode circuit 620 asserts the ATU__Full select line 621 thereby controlling the select element 630 to output a count value produced by the increment circuit 640 as described below.

As further shown, the select element 630 is a multi-input multiplexer, or a group of multi-input multiplexers coupled together to transmit one of a plurality of data inputs. The data inputs of the select element 630 include the entry number via the E__Num lines 631, a "flush entry number" (provided by the flush control circuit 700 of FIG. 7) via input lines 632 (referred to as "Flush" lines), and a count value from the increment circuit 640 via input lines 633 (referred to as "Count" lines). The selection of one of these inputs as the output is controlled by the assertion or de-assertion of the ATU__Full select line 621 by the CAM Address Encode circuit 620 and whether or not the ATU control state machine (not shown) is supporting a flush operation represented by assertion or de-assertion of a Flush Invalidate Update control line 622.

If all of the address translations are actively being used, as signified by all of the CAM Valid bits for the CAM entries and storage elements $611_1$–$611_n$ of the ATU replacement element 610 being "set", the ATU__Full select line 621 is asserted. Assertion of the ATU__Full select line 621 causes the count value, provided by the increment circuit 640, to be output from the select element 630 through the CAM Update address lines 530. The count value represents which entries of the CAM and RAM elements are to be loaded with the new address translation. The increment circuit 640 includes a "Modulo n" counter 641 which is incremented and enabled when the ATU__Full select line 621 is asserted and a CAM Update command is produced by the ATU control state machine 580 of FIG. 5. The increment circuit 640 further includes a lock entry mechanism 660 described below.

Furthermore, the CAM Address Decode circuit 650 includes combinatorial logic coupled to the select element 630 through a feedback loop 651 in order to update the contents of the ATU replacement element 610 based on a modification to a CAM entry in a prior cycle. This entry modification is represented by the entry number, the flush entry number, or the count value being transmitted through the CAM Update address lines 530. The CAM Address Decode circuit 650 is further coupled to the ATU control state machine (not shown) to monitor when a CAM Update command is asserted via CAM command lines 524, and in response, to assert a clock enable control line $614_1$, . . . , or $614_n$ associated with the storage element $611_1$, . . . , or $611_n$ that corresponds to the CAM entry being updated.

Referring still to FIG. 6, the lock entry mechanism 660 operates in conjunction with system software to determine which address translations will be stored in the "locked" region. Also, the lock entry mechanism 660 determines the number of entries of the ATU that are reserved for the "locked" region.

Prior to enabling the ATU 450, address translations of descriptor rings or other generally static data structures are manually written by system software into the ATU starting at a first entry ("entry 0") of the "n" entries of the ATU. If "q" entries are to be reserved as "locked entries," which contain the generally static address translations ("q" being a positive whole number, "q"<"n"), entries "0" through "q–1" should be placed in the locked region by setting (to value "q") a plurality of bits in the ATU control register dedicated to segregate locked and unlocked regions of the memory. More specifically, the plurality of bits represent the starting entry number of the unlocked region in memory. It is contemplated, however, that at least one entry (e.g., "entry n–1") must be placed within the unlocked region.

When the counter 641 is reset, the value of the plurality of bits in the ATU control register is loaded from an increment controller 642 into the counter 641. Thereafter, the counter 641 is incremented until it reaches a count value equal to "n". For its next use (when ATU__Full and the CAM command is an UPDATE command), the count value is set to "q" for the next replacement series.

The replacement circuitry 600 is free to use invalid or unused entries within the locked region to contain new virtual-to-physical address translations, but it cannot invalidate any entry within the locked region through count values produced by the increment circuit 640. Rather, an entry in the locked region can be invalidated only by system software through (1) a software flush of the translation affiliated with the entry, or (2) software manual change of entry due to reinitialization or overwriting of an entry as previously described. It is contemplated that other software flush operations may be utilized. It is further contemplated that the end-of-page access detection will not invalidate the entry so if system software allows locked region entries to be used by data buffers, system software must manually flush the entries from the ATU after the buffer's access has been completed.

Figure 7:
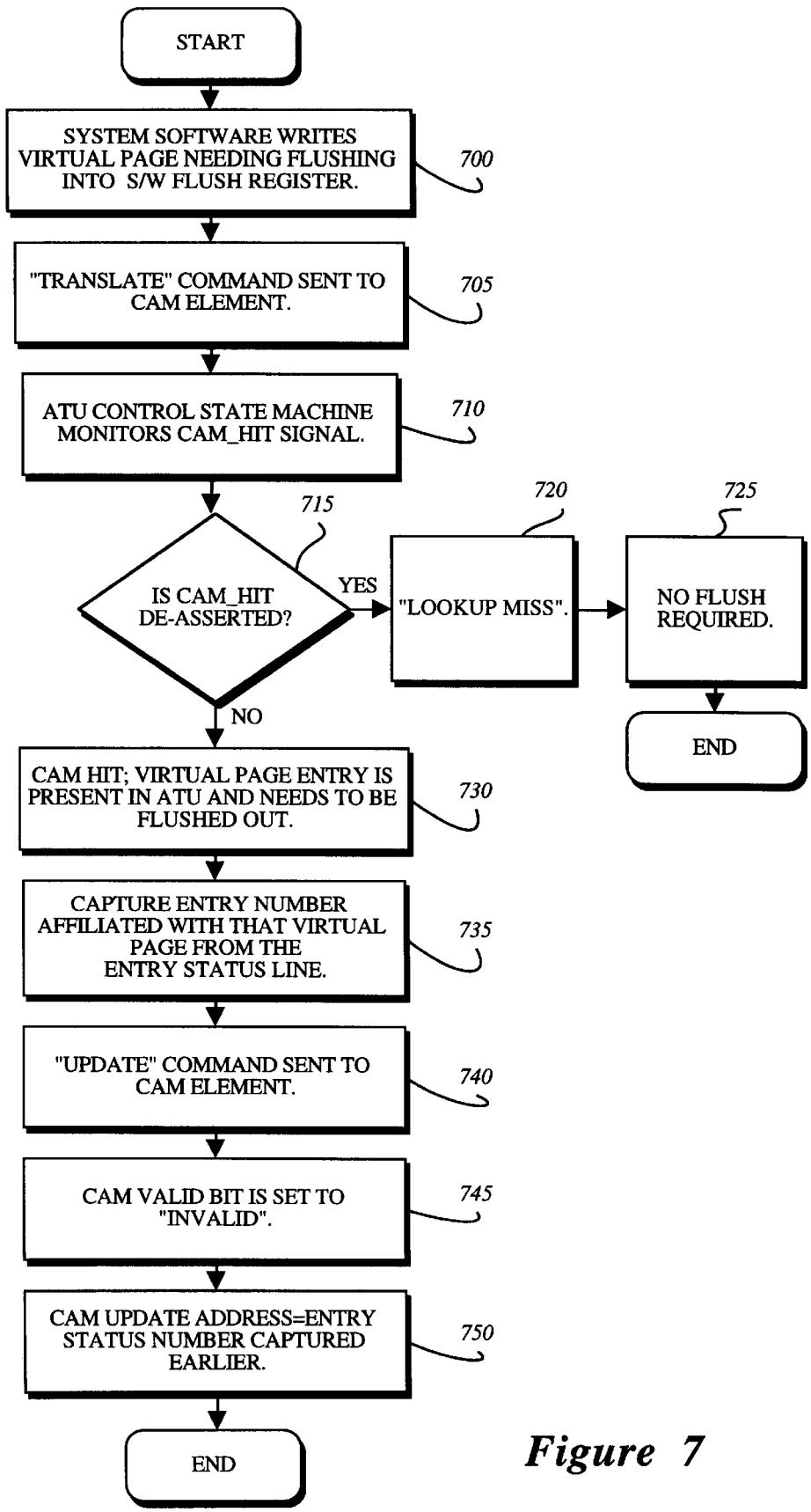
FIG. 7 is a flowchart illustrating an embodiment of the operational steps undertaken by the lock entry mechanism for a software flush.

Referring now to FIG. 7, a flowchart of a software flush cycle used for replacement of an entry in locked or unlocked memory is illustrated. The software flush alone is sufficient to maintain coherency between I/O MMU 250 within bridge element 240, and the ATU 450. However, since the replacement circuitry also performs flush operations, it assists in maintaining consistency between the I/O MMU and the ATU.

As shown, in Step 700, system software writes the virtual page that needs to be flushed into a software flush register located in the slave interface device 410. In Step 705, the TRANSLATE command is then sent to the CAM element 500. In Steps 710 and 715, the ATU control state machine monitors the CAM_Hit signal to determine whether it has been asserted or de-asserted. If the ATU control state machine determines that the CAM_Hit signal has been de-asserted, indicating that there has been a "lookup miss", no flush is required, thereby causing the software flush cycle to end (Steps 720 and 725).

However, if the CAM_Hit signal is asserted, the virtual page to be flushed is still contained in a CAM entry of the ATU 450 and needs to be flushed out (Step 730). In Step 735, the entry number affiliated with that virtual page is captured from the Entry status line 572. Next, in Step 740, an UPDATE command is sent to the CAM element via line 524. The CAM valid bit is invalidated since the information received from lookup address lines 532 is not valid (Step 745). The entry number transferred through the CAM Update address lines 530 is equal to the entry status number that was captured earlier (Step 750). Once the software flush is completed, the cycle ends.

The present invention described herein may be designed in many different methods and using many different configurations. While the present invention has been described in terms of various embodiments, other embodiments may come to mind to those skilled in the art without departing from the spirit and scope of the present invention. The invention should, therefore, be measured in terms of the claims which follows.

What is claimed is:

1. A circuit for segregating memory of an address translation unit into a first region having a first address range and a second region having a second address range, the circuit comprising:
   a counter coupled to the address translation unit, said counter being configured to produce a first count value upon detecting that at least a first command has been issued to the address translation unit and each entry of the memory being in a valid state; and
   an increment controller coupled to said counter, said increment controller being configured to control said counter to produce said first count value that addresses an entry of the memory within said second address range.

2. The circuit according to claim 1, wherein the first region is configured to contain a plurality of address translations which are generally static in nature.

3. The circuit according to claim 2, wherein the second region is configured to contain at least one address translation which is generally dynamic in nature.

4. The circuit according to claim 1, wherein said increment controller loads said first count value equal to a starting address of said second region at initialization.

5. The circuit according to claim 4, wherein said increment controller increments said first count value to form a second count value after said counter has provided said first count value to the address translation unit.

6. The circuit according to claim 5, wherein said increment controller loads a count value equal to said starting address of said second region after said second count value, being an address of a last entry of said second region, has been provided to the address translation unit.

7. The circuit according to claim 4, wherein said increment controller obtains said first count value from a control register set by system software.

8. A network comprising:
   a communication media;
   a first electronic system coupled to the communication media; and
   a second electronic system coupled to said communication media, said second electronic system including
      a plurality of buses including a first bus and a second bus,
      at least one microprocessor coupled to said first bus,
      a main memory coupled to said first bus,
      a bridge element coupled to said first bus and said second bus, and
      a network interface circuit coupled to said second bus, said network interface circuit including
         an address translation unit coupled to said communication media, said address translation unit including a memory element segregated into a first region having a first address range and a second region having a second address range, and
         replacement circuitry coupled to said address translation unit, said replacement circuitry including
            a counter coupled to the address translation unit, said counter being configured to produce a first count value upon detecting that at least a first command has been issued to the address translation unit and each entry of the memory element being in a valid state, and
            an increment controller coupled to said counter, said increment controller being configured to control said counter to produce said first count value that addresses an entry of the memory within said second address range.

9. The network according to claim 8, wherein the first region of the memory element is configured to contain a plurality of address translations which are associated with generally static data structures.

10. The network according to claim 9, wherein the second region of the memory element is configured to contain at least one address translation which are associated with generally dynamic data structures.

11. The network according to claim 8, wherein said increment controller of the replacement circuitry loads said first count value equal to a starting address of said second region when the network interface circuit is initialized.

12. The network according to claim 11, wherein said increment controller of the replacement circuitry increments said first count value to form a second count value after said counter has provided said first count value to the address translation unit.

13. The network according to claim 12, wherein said increment controller of the replacement circuitry loads a count value equal to said starting address of said second region after said second count value being an address of a last entry of said second region has been provided to the address translation unit.

14. The network according to claim 11, wherein said increment controller of the replacement circuitry obtains said first count value from a control register being controlled by system software.

15. A method for segregating memory of an address translation unit implemented in a network interface circuit, the method comprising:
   setting by system software a starting address of an unlocked region in a storage element, wherein an address preceding said starting address represents an ending address of a locked region;
   loading a count value equal to said starting address into a counter when a first command has been issued to the address translation unit and each entry of the memory is in a valid state;

incrementing said count value; and resetting said count value to said starting address when said counter has provided a count value addressing a last entry of the unlocked region.

16. The method according to claim 15, wherein prior to said loading the count value, the method further comprises placing a physical address and a virtual address forming an address translation into the locked region.

17. The method according to claim 16 further comprising invalidating an entry in said locked region by a software flush cycle.

* * * * *